July 27, 1965     H. S. HAWKINS     3,196,910
WORK FEED FOR SAWS
Filed March 30, 1962     2 Sheets-Sheet 2
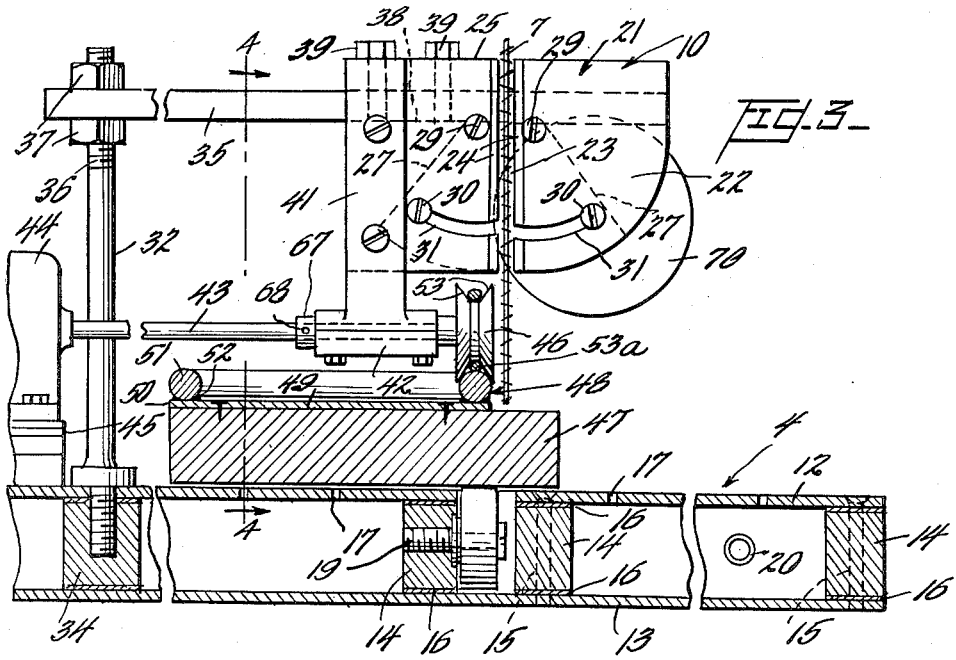
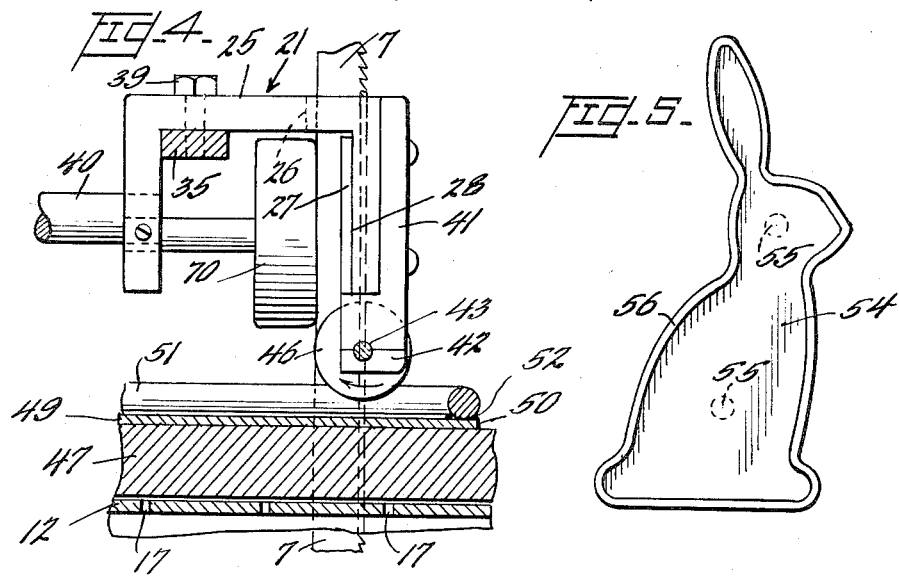
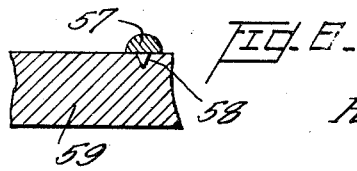
INVENTOR
Havilah S. Hawkins,
BY
ATTORNEYS United States Patent Office 3,196,910
Patented July 27, 1965

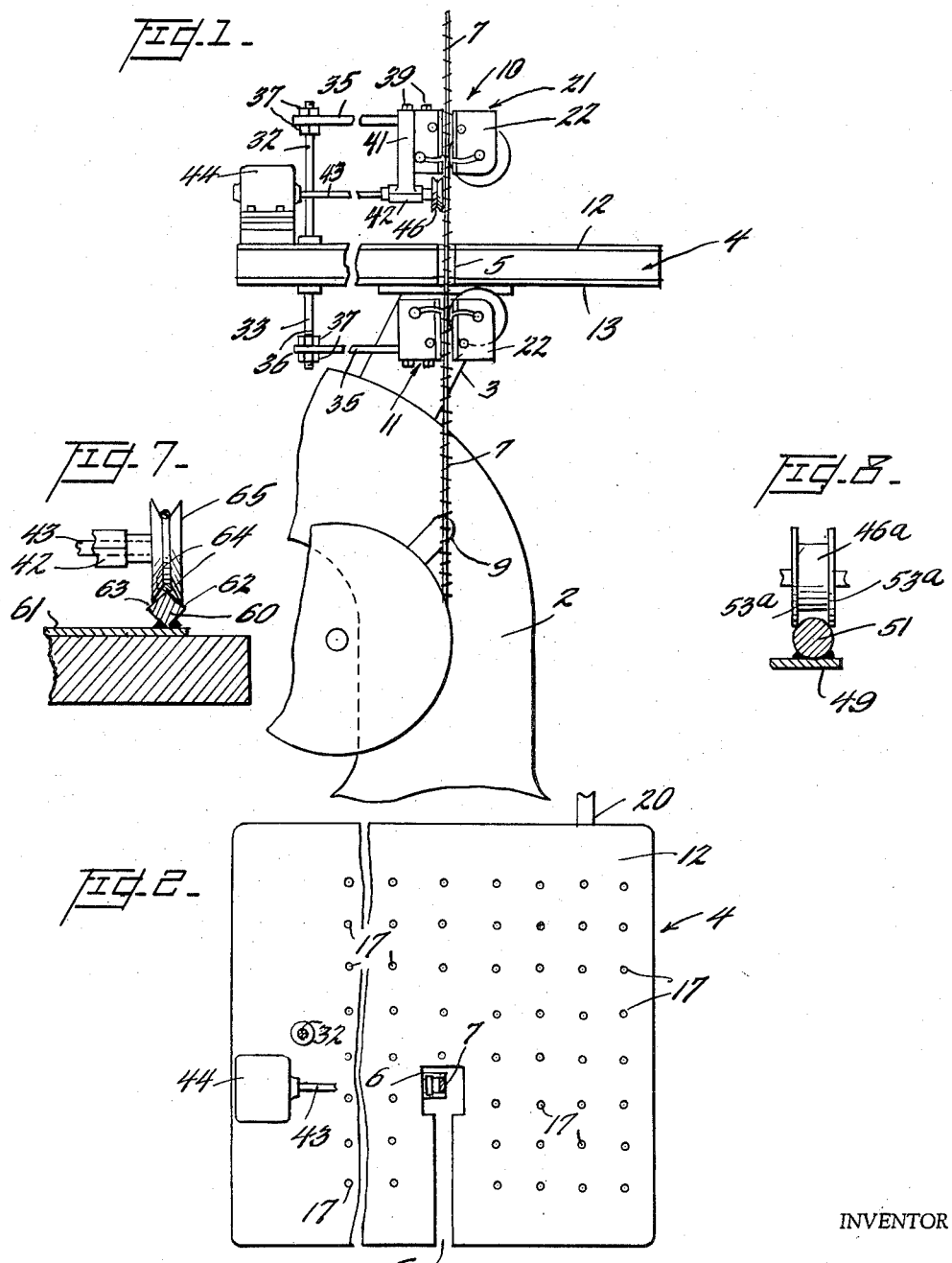

3,196,910
WORK FEED FOR SAWS
Havilah S. Hawkins, Sedgwick, Maine
Filed Mar. 30, 1962, Ser. No. 183,829
8 Claims. (Cl. 143—26)

This invention relates generally to sawing machines and is concerned more particularly with simplifying the production of a plurality of substantially identical articles having irregular peripheries by associating with workpieces from which the articles are produced pattern means for controlling the feed of the workpieces to the saw.

One object of the invention is to provide in a machine of the character described power driven means for feeding workpieces to the saw in combination with means for relieving the frictional drag of the workpieces on the work table of the machine.

More particularly, the invention contemplates providing anti-friction means mounted in the table top to be engaged by a workpiece being sawed, to relieve the thrust of the workpiece against the table under the influence of a power driven friction roller which engages an upper surface of a work unit to move it into the saw.

Another object of the invention is to provide means by which an air cushion is formed between the workpiece and the table top to yieldingly support the workpiece and urge it into engagement with a power driven work feeding drive roller positioned above the table top.

A further object of the invention is to provide an improved work supporting table for a saw machine wherein the table is provided with an interior cavity together with jet apertures extending through the top of the table and in communication with the cavity within the table, and means for supplying gaseous fluid such as air under pressure to the cavity for discharge through said apertures.

A further object of the invention is to provide improved pattern means and work-unit-drive roller means therefor for controlling the feed of the work to the saw.

Another object of the invention is to provide means for mounting saw guide means on the work table in spaced relation to the upper and lower faces thereof and to associate with the upper saw guide means the work-unit-drive roller means so that the work table, the upper and lower saw guide means and the work-unit-drive roller may all be handled as a unit.

These and other objects of the invention will become apparent from reading the following specification in connection with the accompanying drawings wherein FIG. 1 is a fragmentary front elevation of a saw machine having my invention mounted thereon, FIG. 2 is a top plan view of the work table of the machine, showing the saw in action, FIG. 3 is a fragmental sectional view of the work table, with the work feed attachment in place, FIG. 4 is a fragmental sectional view taken on the line 4—4 of FIG. 3, FIG. 5 is a plan view of one form of a pattern member, FIG. 6 is a detailed view with parts in section, of a modified form of the pattern rib, FIG. 7 is a further modification of a pattern rib member with parts shown in cross section, and FIG. 8 is a detailed view of a modified form of work unit drive roller.

Referring more in detail to the accompanying drawings wherein like reference numerals are used to designate like parts throughout, I have shown my invention applied to a conventional band saw machine, which may include the usual supporting base (not shown) from which rises a generally C-shaped standard or frame member 2 which supports the main elements of the machine. Thus, a bracket arm 3 is provided to support a work table 4. The table 4 is provided with the usual saw receiving slot 5 extending from one edge of the table inwardly towards the center thereof, where there is provided an enlarged opening 6 through which the band saw blade 7 passes.

The saw blade 7 passes about an upper pulley (not shown) and a lower pulley 8, one of which, preferably the pulley 8, may be driven in any convenient manner as by an electric motor (not shown). The pulley 8 and the driving motor may be supported from the standard 2 by a conventional bracket arm 9. The saw blade 7 is maintained in proper position with respect to the opening 6 by saw guide members indicated at 10 and 11, which members will be described more in detail hereinafter.

The work table 4 is made hollow as shown more particularly in FIG. 3 and comprises top and bottom plate members 12 and 13 respectively, secured in any desired manner to frame members 14, as by screws 15. The joint between the plates 12 and 13 and the frame members 14 preferably includes packing means 16 to preclude leakage of air from within the table top, as will be hereinafter explained. The top plate 12 of the table is provided with a plurality of small jet-like apertures 17 which pass completely through the plate in a direction generally perpendicular to the plate thereof, and are in communication at their inner ends with the interior of the work table. The apertures 17 are distributed substantially uniformly throughout the table top as shown in FIG. 2.

Within the saw blade opening 6 in the work table 4 there is mounted an anti-friction roller 18 for rotation about a generally horizontal axis as shown in FIG. 3. The roller 18 may be mounted on a stud member 19 secured to and projecting from a frame member 14 as shown, and in position so that the upper periphery of the roller lies slightly above the plane of the table top for a purpose to be later explained. The interior of the table top is adapted to be placed in communication with a source of air under pressure (not shown) by any convenient means, such as a nipple 20.

Referring now to the saw guide members 10 and 11, previously mentioned, these guides with but slight modification follow closely the construction of the saw guides shown and described in my copending application Serial No. 38,280, now Patent No. 3,068,913. Each comprises a block or frame member 21 of inverted channel section as shown in FIGS. 3 and 4. The front face 22 of the guide member 10 is vertically slotted as at 23, and the edges of the slot are preferably beveled as shown at 24. The slot 23 is positioned to accommodate the saw blade 7 as shown and penetrates the top wall 25 of the block 21 a sufficient distance to accommodate the depth of the saw blade as shown at 26, FIG. 4. On each side of the slot 23 the frame or block 21 is provided with adjustable saw blade abutment members 27. The abutment members 27 are generally triangular in shape and are supported upon the inner face 28 of the front wall 22 of the frame 21 by screws 29 (see FIG. 3). The saw abutment members 27 are mounted for swinging adjustable movement about the screws 29 as pivots, in order that they may be properly positioned with respect to the side faces of the blade 7 and to this end the abutment members, at points remote from the pivot screws 29 therefor, are each provided with a locking screw 30 which extends forwardly through arcuate slots 31 respectively, provided in the front wall 22 of the block 21. By tightening the screws 31, when the members 27 are in properly adjusted position, the members 27 are maintained in such position. As thus described, the saw guide members 10 and 11 may be identical and are mounted as shown in spaced relation to the work table above and below the top and bottom thereof respectively, with the guide 11 being inverted with respect to the guide 10, as shown.

The saw guide members 10 and 11 may be mounted in proper position with respect to the saw blade 7 and table top 4 by any convenient means. I have shown stud members 32 and 33 passing through the plate members 12 and 13, respectively, of the table top and threadedly engaged with a spacer block 34 within the table top as shown in FIG. 3. The studs 32 and 33 each support a laterally extending arm 35, which arms are adjustably mounted on the respective studs by screw threads 36 and lock nuts 37 as shown. Thus the arms 35 may be adjusted within a limited range of movement towards and away from the plane of the table.

The free end 38 of each arm 35 may support one of the saw guide members as shown. Thus the end 38 of the arm 35 of the stud 32 is received within the channel formation of the block 21 of the upper guide member 10 and is secured to the top wall 25 of said block by screws 39 (see FIGS. 3 and 4). The saw guide member 11 may be similarly supported by the stud 33 as shown, and beneath the table 4. The studs 32 and 33 and the arms 35 provide adequate rigidity and adjustability for the saw guide members 10 and 11, but if additional support is required in special instances, the rearwardly projecting stud member 40 carried by each of the guide members may be secured to an appropriate part of the saw machine frame as suggested in my copending application Serial No. 38,280, above referred to. If desired, the guide members 10 and 11 may each be provided with a central blade backup roller 70 as shown in FIG. 4 and as fully described in my aforesaid application. The adjustability of the arm 35 and the attached saw guide member 10 with respect to the stud 32 and the table top is for the purpose of accommodating work units having substantially different vertical dimensions, as will be apparent from what follows.

As previously stated my invention includes means for automatically feeding a work unit to the saw and to this end the front wall 22 of the frame 21 of the top guide member 10 may support a downwardly extending plate 41 as shown in FIGS. 3 and 4, said plate having its lower end provided with a bearing cap 42 arranged to support a horizontally disposed drive shaft 43. The shaft 43 as shown in FIG. 3 is disposed in substantial parallelism with the plane of the work supporting surface of the table 4 and as shown in FIG. 3 the axis of the shaft 43 is in substantial alignment with the cutting edge of the saw. The shaft 43 may be properly positioned as described by adjustably mounting a driving motor 44 therefor on the table 4 as by shim blocks 45, or any other convenient means as shown. On the end of the shaft 43 adjacent to the saw blade as shown in FIG. 3 there is mounted a work unit driving roller 46, said roller rotating in a plane substantially parallel to the plane of the saw blade 7. Any convenient gear reduction means (not shown) may be employed between the motor 44 and the drive shaft 43 if found desirable, in order to provide for the driving roller 46 a desirable speed having in mind the cutting rate of the saw in respect to the work being operated upon.

As shown in FIG. 3, the work driving roller 46 is provided with a peripheral circumferential groove generally concave or V-shape in cross section for the purpose of operatively engaging a pattern member to be secured to the upper face of a workpiece. In FIG. 3 the workpiece 47 has secured to its upper surface a pattern member indicated generally at 48 and including a sheet member 49 having an irregular periphery corresponding to the periphery to be produced in the workpiece 47 by the saw. Mounted upon the sheet member 49 in close proximity to the contoured edge 50 thereof is a pattern rib 51. The rib 51 is contoured to provide the same pattern delineations as are present in the contoured edge 50 of the pattern sheet 49 and may be secured to the sheet member 49 by welding as shown at 52. The pattern rib 51 may be a wire or rod circular in cross section as shown, so that the upper surface thereof that is engaged by the flanges 53 of the roller 46 is generally in the form of a segment of a circular arc, thus providing plural contact areas between the rib 51 and the flanges 53 of the roller 46 which areas lie respectively on opposite sides of a plane passed centrally through the rib parallel to the plane of the saw. If desired, a resilient O-ring 53a may be seated within the apex of the V groove of the roller to increase the driving friction between the roller and the workpiece. This arrangement is clearly shown in FIG. 3 of the drawings.

As previously indicated, an important object of the present invention is to relieve in part the frictional drag of the work unit on the table top when moved thereover under the influence of the drive roller 46, having in mind that the relative positions of the driving roller and work unit will produce a downward thrust on the table top when the saw is in operation. The antifriction roller means 18 previously described partly relieves this thrust, particularly in the region of the path of movement of the saw, but I propose further to reduce this overall drag friction of the workpiece on the table top, substantially throughout the area of the table top engaged by a workpiece being processed, by the hollow, perforated table top 12 previously described. Thus, when air under pressure is supplied to the interior of the table top 4 by means of the nipple 20, the work unit on the table top is thrust yieldingly upwardly by the air jets issuing from the apertures 17. The escape of air from said apertures is restricted by the close proximity of the underside of a work unit supported on the table top with the result that a cushion of air is formed beneath the work unit which cushion effectively supports and relieves friction between the work unit and the table top. Furthermore, this cushion of air exerts a yielding upward force tending to maintain the pattern rib 51 of the work unit in firm driving relation to the roller 46.

The present invention is particularly useful in the production of a number of substantially identical articles such as figure toys, ping pong paddles, and the like. Thus in FIG. 5 I have shown a pattern member designed to produce a toy rabbit, the same including a sheet member 54 carrying pins 55 by which the sheet member may be secured to a workpiece, the sheet member having secured to its contoured edge a pattern rib such as shown at 56. A modified form of pattern rib is shown in FIG. 6 where the rib member 57 is shown in the form of a substantially half round rod or wire carrying integral tangs 58 which may be driven into the upper surface of the workpiece 59 and thus dispense with the necessity for the sheet member 54 as described in connection with the modifications shown in FIGS. 3 and 5. As hereinbefore described, it is desirable to have the rib member 51 or a modification thereof, have a configuration on its upper roll-engaging surface such that roll-engaging areas are provided spaced respectively on opposite sides of a vertical plane passing centrally through the rib. With this in mind, a further modification of the rib is shown in FIG. 7 where a rib 60 is shown secured to a pattern sheet 61, the rib 60 being in the form of a rod or wire having a substantially square cross sectional area, thus providing at the upper roller-contacting surface thereof oppositely inclined, plane surfaces 62 and 63 which may engage the inclined flanges 64 of the roller 65 to provide the spaced roller-contacting areas previously described. In FIG. 8 a modified form of work unit driving roller 46a is shown, the same having spaced side flanges 53a arranged substantially perpendicular to the axis of the roller and disposed to engage the pattern rib 51 at spaced points, as shown. In all instances the flanges of the driving roller engage the rib member at points spaced on opposite sides of a vertical plane passed therebetween perpendicular to the axis of the roller, said plane to give substantially uniform lateral driving thrust between the roller and the rib members and thus maintain proper positioning of the work unit and the saw blade, while at the same time imparting a downward driving thrust component on the rib which is taken by the antifriction means 18 and/or the yielding air cushion provided by the air jets issuing from the apertures 17 of the plate 12 as the work unit is fed into the saw.

In view of the foregoing, it will be appreciated that duplicate articles having substantially identical contoured peripheries may be produced by simply placing a work unit including a workpiece, a pattern member, and a pattern rib on the table top under the work driving roller while the feeding movement of the workpiece into the saw is accomplished entirely by the driving roller in engagement with the pattern rib. The dual engagement areas or lines of contact between the flanges of the driving roller and the respective pattern rib members insure proper and automatic lateral positioning of the workpiece with respect to the saw at all times. Depending upon the severity of the curved delineations in the pattern piece, it may be found necessary to adjustably mount the driving roller with respect to the saw blade and to this end, the shaft 43 is provided with an adjustable collar 67 positioned to engage the end of the bearing 42, the collar 67 being secured in adjusted position on the shaft 43 by set screws 68. The motor 44 can of course be adjusted towards and away from the saw accordingly.

It should be noted that by mounting the saw guide means on opposite faces of the work table and associating the work unit drive means with the upper saw guide means as shown, the entire organization including the work table, upper and lower saw guide means, and the work unit driving means, may be handled as a unit.

It will be understood that the rabbit pattern of FIG. 5 is merely illustrative of many different articles that may be made by appropriately formed patterns, and those skilled in the art to which this invention relates will realize that various modifications may be made in size and disposition of the parts herein described without departing from the spirit of the invention which is set forth more particularly in the appended claims.

What I claim is:

1. In combination, a saw machine including a work supporting table having a saw blade receiving opening therein and means for driving a saw blade downwardly through said opening, a work-unit driving and guiding roller carried by the machine for rotation about an axis passing through the cutting edge of the saw above and generally parallel to the plane of the work supporting table and substantially perpendicular to the plane of the saw, the periphery of said roller having a circumferential groove generally concave in cross section and disposed in a plane substantially parallel to the plane of the saw, and a work unit including a workpiece and a pattern piece secured to the upper surface thereof, said work unit being slidably supported upon the work table, said pattern piece including an upwardly directed contoured peripheral rib member having a free upper edge portion received within the groove in said roller and positioned to be operatively engaged by said grooved roller, said rib member having a cross sectional configuration defining plural roller engaging areas lying respectively on opposite sides of a vertical plane passing centrally through said rib perpendicular to the axis of the roller whereby to shift the work unit on the work table about an axis parallel to the cutting edge of the saw.

2. The apparatus described in claim 1 wherein the upper roller engaging surface of said rib member is convex upwardly and generally in the form of a segment of a circular arc in cross sectional contour.

3. The apparatus described in claim 1 wherein said rib member is provided with integral tangs adapted to be driven into said workpiece for securing the rib member thereto.

4. The apparatus described in claim 1 wherein said pattern member includes a peripherally contoured pattern sheet secured to said workpiece, and wherein said rib member is secured to said pattern sheet adjacent to the contoured edge thereof, said rib member being correspondingly contoured and having the pattern delineations thereof in register with those of the sheet.

5. The apparatus described in claim 1 wherein means are provided for establishing a yielding cushion of air between the work unit and the table top for urging the work unit upwardly and thus maintaining the unit in driving engagement with the driving and guiding roller and for relieving frictional drag of the work unit on the table top.

6. In combination, a saw machine including a work supporting table having a saw blade receiving opening therein and means for driving a saw blade downwardly through said opening, a work unit driving and guiding roller carried by the machine for rotation about an axis above and generally parallel to the plane of the work supporting table and generally perpendicular to the path of movement of the saw blade, the periphery of said roller having a circumferential groove generally concave in cross section and a work unit including a workpiece and a pattern piece secured to the upper face thereof, said pattern piece including an upwardly directed, contoured peripheral rib member having a free upper edge portion engaged within the groove of said roller and positioned to be operatively engaged by said grooved roller, said rib member having a cross sectional configuration defining plural roller engaging areas lying respectively on opposite sides of the plane passing centrally through said rib member and perpendicular to the axis of said roller, and means for establishing a yielding cushion of air between the table top and a workpiece supported thereon to urge the workpiece into driving contact with the roller and to thereby relieve frictional drag of the workpiece on the table top.

7. The apparatus described in claim 6 wherein said last-mentioned means includes the provision of a cavity within the table top, means for supplying air under pressure to said cavity, said table top being provided with a plurality of apertures communicating at their inner ends with said cavity.

8. The apparatus described in claim 6 wherein the axis of rotation of the work unit driving and guiding roller is substantially aligned with and passes through that portion of the path of movement of the saw blade that is traversed by the toothed edge of the blade.

References Cited by the Examiner

UNITED STATES PATENTS

| 242,004 | 5/81 | Lally et al. | |
| 769,497 | 9/04 | Seymour | 143—26 |
| 1,390,487 | 9/21 | Black et al. | |
| 2,125,239 | 7/38 | Hawes | 144—145 |
| 2,765,008 | 10/56 | Hawkins. | |
| 2,773,527 | 12/56 | Smith | 144—145 |
| 2,934,107 | 4/60 | Hawkins | 143—26 X |
| 3,010,352 | 11/61 | Dunlap | 83—483 |
| 3,052,339 | 9/62 | Carter | 83—402 |

FOREIGN PATENTS 725,841  3/55  Great Britain.

WILLIAM W. DYER, JR., *Primary Examiner.*

WILLIAM FELDMAN, DONALD R. SCHRAN,
*Examiners.*